(12) United States Patent
Izuo et al.

(10) Patent No.: US 11,724,758 B2
(45) Date of Patent: Aug. 15, 2023

(54) MOTOR-DRIVEN VEHICLE

(71) Applicants: TOYOTA JIDOSHA KABUSHIKI KAISHA, Toyota (JP); The University of Tokyo, Bunkyo-ku Tokyo (JP)

(72) Inventors: Takashi Izuo, Toyota (JP); Tomoyuki Takahata, Tokyo (JP)

(73) Assignees: TOYOTA JIDOSHA KABUSHIKI KAISHA, Toyota (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 17/525,483

(22) Filed: Nov. 12, 2021

(65) Prior Publication Data

US 2022/0153365 A1 May 19, 2022

(30) Foreign Application Priority Data

Nov. 16, 2020 (JP) ................................. 2020-190506

(51) Int. Cl.
  *B62D 61/12* (2006.01)
  *B60K 17/08* (2006.01)
  *B60K 17/22* (2006.01)
  *B60K 17/02* (2006.01)

(52) U.S. Cl.
  CPC ............ *B62D 61/125* (2013.01); *B60K 17/02* (2013.01); *B60K 17/08* (2013.01); *B60K 17/22* (2013.01)

(58) Field of Classification Search
  CPC .. B62D 61/125; B62D 57/022; B62D 57/024; B62D 61/10; B60K 17/02; B60K 17/08; B60K 17/22; B60K 17/32; B60K 17/36; B60K 7/0007; B60K 17/046; Y02T 10/72
  See application file for complete search history.

(56) References Cited

U.S. PATENT DOCUMENTS

| | | | | |
|---|---|---|---|---|
| 1,839,785 A | * | 1/1932 | Church | B60K 17/36 475/225 |
| 2,287,438 A | * | 6/1942 | Lindsay | B60K 17/36 180/370 |
| 2,824,615 A | * | 2/1958 | Lado | B60K 17/342 474/112 |
| 3,343,621 A | * | 9/1967 | Van Doorne | B60G 5/04 180/22 |
| 3,348,518 A | * | 10/1967 | Forsyth | B63H 1/34 180/9.1 |

(Continued)

FOREIGN PATENT DOCUMENTS

| | | |
|---|---|---|
| JP | S63-258275 A | 10/1988 |
| JP | H01172026 A | 7/1989 |

(Continued)

*Primary Examiner* — Paul N Dickson
*Assistant Examiner* — Timothy Wilhelm
(74) *Attorney, Agent, or Firm* — Dinsmore & Shohl LLP

(57) ABSTRACT

A motor-driven vehicle includes: a motor, a first rotational shaft to be driven to rotate by the motor, a clutch, a second rotational shaft to be driven to rotate by the motor via the clutch, an arm configured to rotate in association with rotation of the second rotational shaft, and at least two wheels, wherein each of the at least two wheels being attached to the arm at a position offset from a rotation center of the arm, and each of the at least two wheels being rotatable in association with rotation of the first rotational shaft.

6 Claims, 8 Drawing Sheets

(56) References Cited

U.S. PATENT DOCUMENTS

| | | | | |
|---|---|---|---|---|
| 3,442,345 A * | 5/1969 | Berger | B62D 53/005 | 180/24.11 |
| 3,786,888 A * | 1/1974 | Nelson | B60K 17/046 | 180/24.11 |
| 4,049,071 A * | 9/1977 | Stedman | B60K 17/14 | 180/24.07 |
| 4,577,711 A * | 3/1986 | Butler | B62D 61/10 | 180/24.1 |
| 4,803,897 A * | 2/1989 | Reed | B62D 11/10 | 475/6 |
| 4,993,912 A * | 2/1991 | King | B62D 61/12 | 89/929 |
| 5,417,297 A * | 5/1995 | Auer | B60K 17/046 | 180/24.09 |
| 5,833,248 A * | 11/1998 | Eguchi | A61G 5/063 | 280/5.28 |
| 6,053,837 A * | 4/2000 | Auer | B60K 17/36 | 475/221 |
| 6,589,098 B2 * | 7/2003 | Lee | A63H 17/004 | 446/469 |
| 6,662,889 B2 * | 12/2003 | De Fazio | B62D 57/02 | 280/5.32 |
| 7,258,182 B2 * | 8/2007 | Auer | B60K 17/36 | 180/343 |
| 7,784,569 B2 * | 8/2010 | Cheng | A61G 5/063 | 180/41 |
| 7,891,446 B2 * | 2/2011 | Couture | B25J 5/005 | 180/9.32 |
| 8,016,065 B2 * | 9/2011 | Osborn | B60K 17/342 | 180/6.48 |
| 8,019,472 B2 * | 9/2011 | Montero SanJuan | B62D 57/024 | 180/8.5 |
| 8,056,662 B2 * | 11/2011 | Schoon | B60K 17/342 | 180/245 |
| 8,327,960 B2 * | 12/2012 | Couture | B25J 11/0025 | 180/9.1 |
| 8,393,420 B2 * | 3/2013 | Kim | B62B 5/026 | 180/8.2 |
| 8,409,042 B2 * | 4/2013 | Yang | B60K 7/0007 | 475/149 |
| 8,561,732 B2 * | 10/2013 | Schoon | E02F 9/02 | 180/6.48 |
| 8,662,215 B1 * | 3/2014 | Ohm | B62D 55/065 | 180/8.5 |
| 8,672,065 B2 * | 3/2014 | Beck | B60K 17/02 | 180/347 |
| 9,045,177 B2 * | 6/2015 | Chou | B60F 3/00 | |
| 9,358,880 B2 * | 6/2016 | Bindl | B60K 17/36 | |
| 9,527,213 B2 * | 12/2016 | Luo | B25J 9/1694 | |
| 9,561,829 B1 * | 2/2017 | Urata | B62D 57/032 | |
| 9,650,088 B2 * | 5/2017 | Haar | B62D 55/04 | |
| 9,989,970 B1 * | 6/2018 | Morey | B62D 57/024 | |
| 10,065,500 B2 * | 9/2018 | Higuchi | B60K 17/24 | |
| 10,124,844 B2 * | 11/2018 | Brinkley | B62D 55/092 | |
| 10,800,221 B2 * | 10/2020 | Liivik | G05D 1/021 | |
| 10,836,227 B2 * | 11/2020 | Dyna | B62D 7/04 | |
| 10,967,926 B2 * | 4/2021 | Liivik | B62D 57/024 | |
| 11,376,956 B2 * | 7/2022 | Fliearman | B60G 13/04 | |
| 2016/0178041 A1 * | 6/2016 | Hagman | B60K 17/046 | 475/204 |

FOREIGN PATENT DOCUMENTS

| | | |
|---|---|---|
| JP | H07002154 A | 1/1995 |
| JP | H09309469 A | 12/1997 |
| JP | H10-292854 A | 11/1998 |
| JP | 2018-535875 A | 12/2018 |
| WO | 2017/076813 A1 | 5/2017 |

* cited by examiner

|  | NUMBER OF TEETH | GEAR RATIO |
|---|---|---|
| FIRST SPEED REDUCER 22 |  | 10 |
| PULLEY 24 | 18 | 2.11 |
| PULLEY 33 | 38 | |
| SECOND SPEED REDUCER 30 |  | 5 |
| PULLEY 31 | 30 | 1.27 |
| PULLEY 35 | 38 | |
| SUN GEAR 50 | 50 | 2 |
| PLANETARY GEAR 51 | 100 | |

MOTOR-DRIVEN VEHICLE

CROSS-REFERENCE TO RELATED APPLICATION

This application claims priority to Japanese Patent Application No. 2020-190506 filed on Nov. 16, 2020, incorporated herein by reference in its entirety.

BACKGROUND

1. Technical Field

The technology disclosed herein relates to a motor-driven vehicle. In particular, the technology relates to a structure of a vehicle configured to ascend or descend a staircase.

2. Description of Related Art

Japanese Unexamined Patent Application Publication No. 7-2154 (JP 7-2154 A) describes a motor-driven vehicle having two wheels attached to each arm and configured to ascend or descend steps by using rotation of the arms and rotation of the wheels.

SUMMARY

The motor-driven vehicle described above has arm motors and wheel motors. Therefore, a problem arises in that the motor-driven vehicle has a large number of motors.

A motor-driven vehicle according to one aspect disclosed herein includes a motor, a first rotational shaft to be driven to rotate by the motor, a clutch, a second rotational shaft to be driven to rotate by the motor via the clutch, an arm configured to rotate in association with rotation of the second rotational shaft, and at least two wheels, each of the at least two wheels being attached to the arm at a position offset from a rotation center of the arm, and each of the at least two wheels being rotatable in association with rotation of the first rotational shaft.

According to the aspect described above, the at least two wheels can be rotated by the first rotational shaft by disengaging the clutch. Further, the arm can be rotated by the second rotational shaft by engaging the clutch. The arm and the wheels can be driven by one motor. The number of motors can be reduced as compared to a case where an arm motor and a wheel motor are provided individually.

In the aspect described above, the motor-driven vehicle may further include a brake configured to restrict the rotation of the second rotational shaft. According to the aspect described above, the arm can be fixed.

In the aspect described above, the motor-driven vehicle may further include a processor configured to selectively execute a first mode in which the clutch is disengaged and the brake is operated, or a second mode in which the clutch is engaged and the brake is released. According to the aspect described above, the arm can be fixed by the brake in the first mode. In the second mode, the arm can be rotated by engaging the clutch.

In the aspect described above, the motor-driven vehicle may further include a sun gear located at the rotation center of the arm and rotatable in association with the rotation of the first rotational shaft, and planetary gears located at rotation centers of the at least two wheels and engaging with the sun gear. A central axis of the first rotational shaft and a central axis of the second rotational shaft may be coaxial. According to the aspect described above, the at least two wheels can be rotated in association with the rotation of the first rotational shaft. Further, the at least two wheels can be rotated about the rotation center of the arm.

In the aspect described above, a gear ratio among the second rotational shaft, the sun gear, and the planetary gears may be $(n+1):1:-n$. The negative sign of the value in the ratio indicates that the elements rotate in opposite directions. According to the aspect described above, it is possible to achieve an operation in which the arm rotates relative to a vehicle body without rotating the wheels relative to the vehicle body.

In the aspect described above, the second rotational shaft may be a hollow shaft. The first rotational shaft may penetrate the second rotational shaft. According to the aspect described above, the central axis of the first rotational shaft and the central axis of the second rotational shaft can be coaxial.

In the aspect described above, the motor-driven vehicle may further include a first driving shaft to be driven to rotate by the motor, a second driving shaft to be driven to rotate by the motor via the clutch, a first power transmission mechanism connecting the first driving shaft and the first rotational shaft, and a second power transmission mechanism connecting the second driving shaft and the second rotational shaft. According to the aspect described above, the arm and the wheels can be driven by one motor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Structure of Vehicle 1

Figure 1:
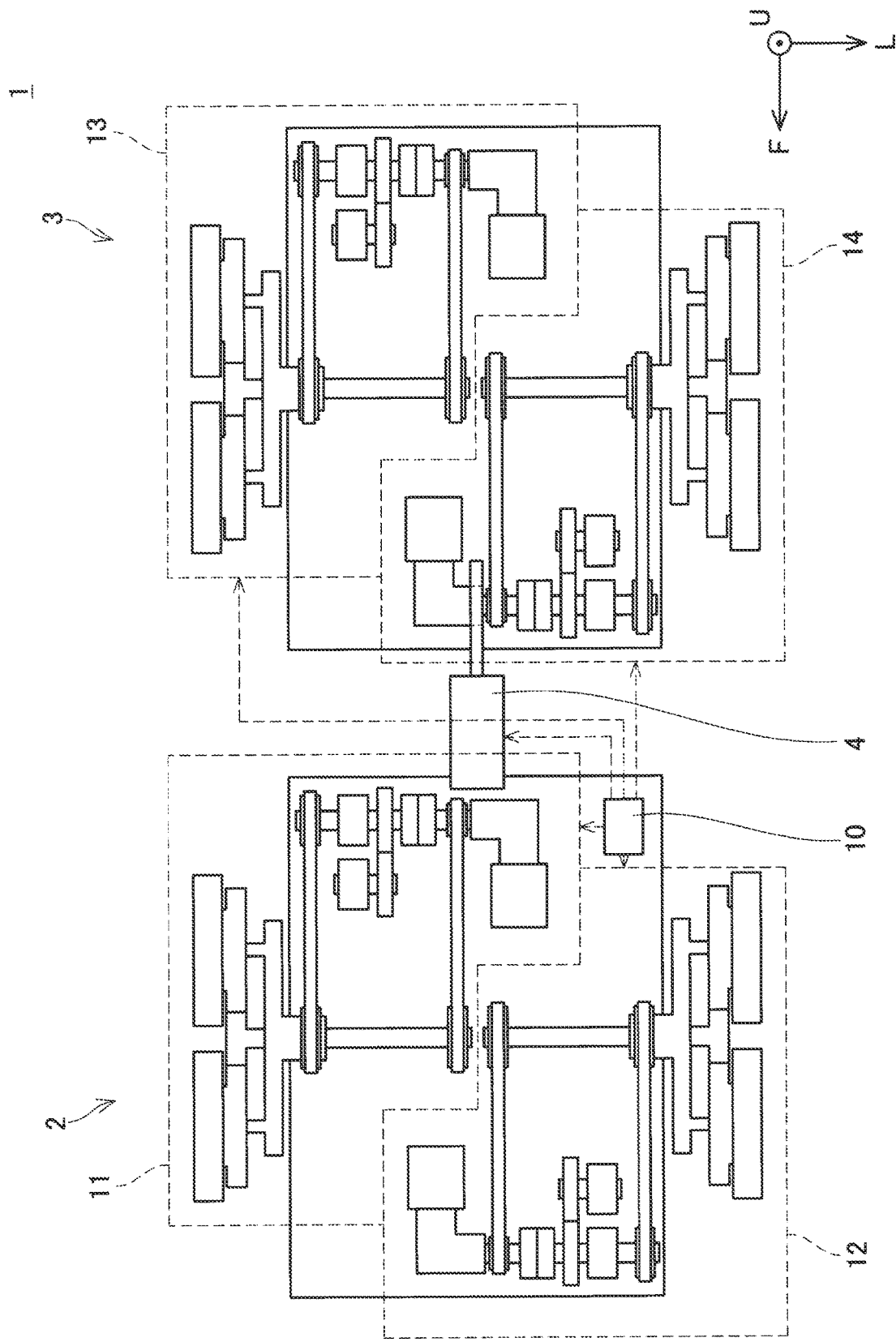
FIG. 1 is a schematic top view of a vehicle 1.

FIG. 1 is a schematic top view of a vehicle 1. In a coordinate system of FIG. 1, a symbol "F" represents a forward vehicle direction. A symbol "U" represents an upward vehicle direction. A symbol "L" represents "left" when the front of the vehicle is viewed from the rear. In the other figures, the coordinate system has the same meanings.

The vehicle 1 includes a front vehicle 2, a rear vehicle 3, and a direct-drive actuator 4. The direct-drive actuator 4 is a member that couples the front vehicle 2 and the rear vehicle 3. A processor 10 causes the direct-drive actuator 4 to extend or contract to variably control a distance between the front vehicle 2 and the rear vehicle 3. The front vehicle 2 includes the processor 10 and a pair of right and left units 11 and 12. The rear vehicle 3 includes a pair of right and left units 13 and 14. The processor 10 includes a central processing unit (CPU) and a memory (both are not illustrated), and is communicable with the units 11 to 14 and the direct-drive actuator 4. Since the units 11 to 14 have the same structure, the unit 11 is mainly described below.

Figure 2:
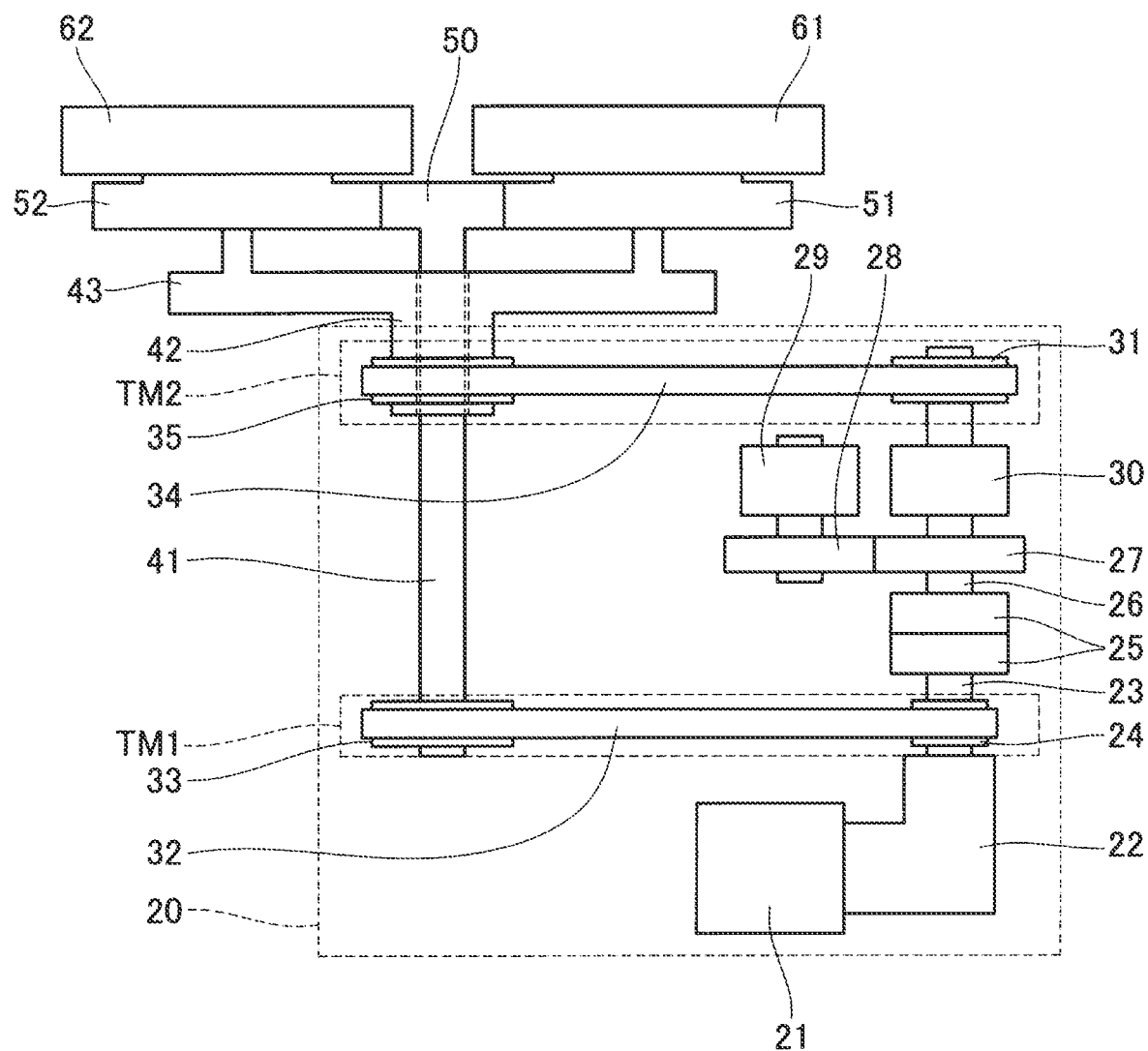
FIG. 2 is a schematic top view of a unit 11.
Figure 2:
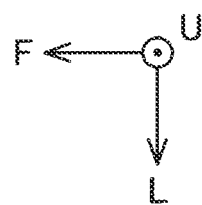
Figure 3:
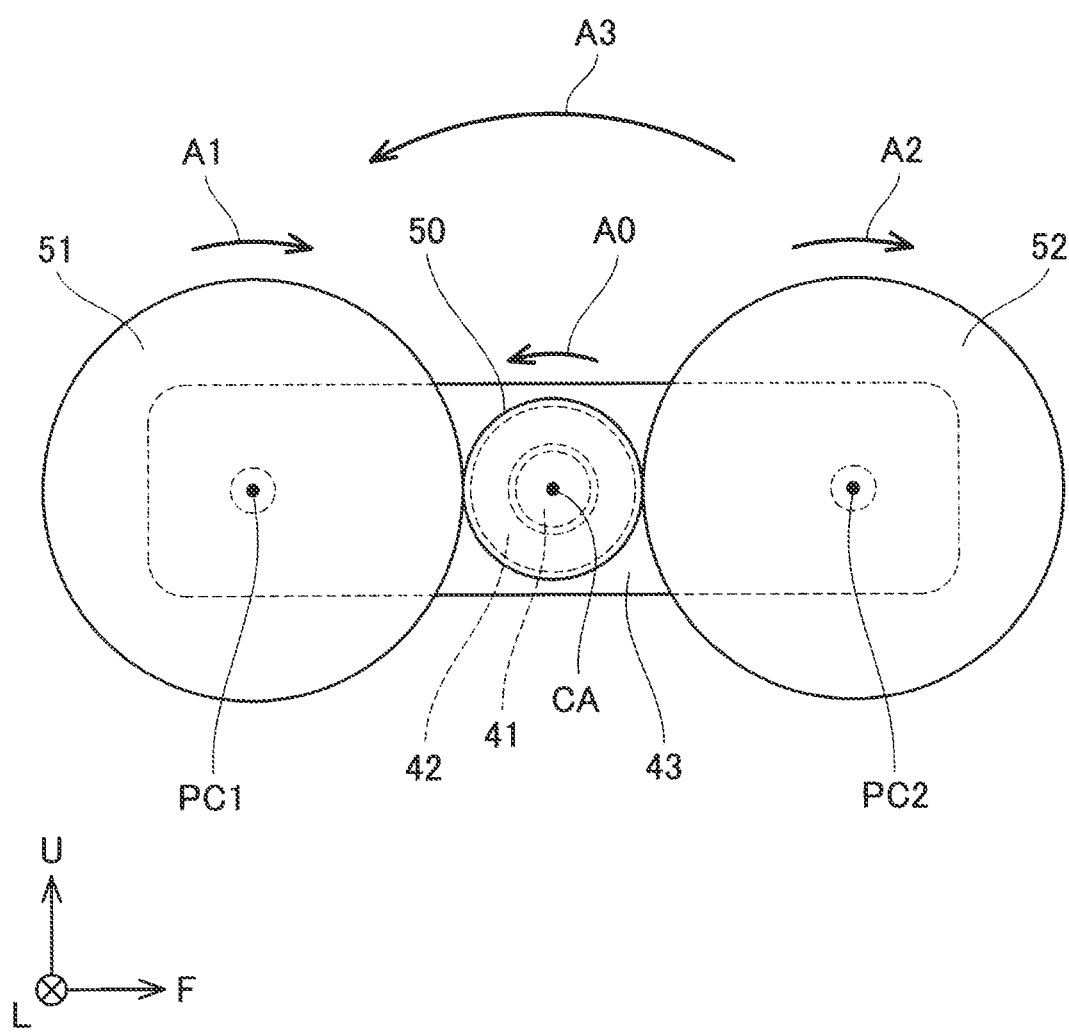
FIG. 3 is a side view of the unit 11.

FIG. 2 is a schematic top view of the unit 11. The unit 11 includes a driver 20, a first rotational shaft 41, a second rotational shaft 42, an arm 43, a sun gear 50, planetary gears 51 and 52, and wheels 61 and 62. FIG. 3 is a side view of the unit 11 that is viewed from the right of the vehicle 1. In FIG. 3, the first rotational shaft 41, the second rotational shaft 42, the arm 43, the sun gear 50, and the planetary gears 51 and 52 are taken in the illustration.

The second rotational shaft 42 is a hollow shaft. The first rotational shaft 41 penetrates the second rotational shaft 42. Thus, the first rotational shaft 41 and the second rotational shaft 42 have the same central axis CA. That is, the first rotational shaft 41 and the second rotational shaft 42 are coaxial. The arm 43 is connected to one end of the second rotational shaft 42. A pulley 35 is arranged at the other end of the second rotational shaft 42. The second rotational shaft 42 can be driven to rotate by transmitting power to the pulley 35 via a belt 34. The arm 43 rotates in a direction of an arrow A3 in FIG. 3 in association with the rotation of the second rotational shaft 42.

The sun gear 50 is located at the central axis CA that is a rotation center of the arm 43. The sun gear 50 is connected to one end of the first rotational shaft 41. A pulley 33 is arranged at the other end of the first rotational shaft 41. The first rotational shaft 41 can be driven to rotate by transmitting power to the pulley 33 via a belt 32. The sun gear 50 rotates in a direction of an arrow A0 in FIG. 3 in association with the rotation of the first rotational shaft 41.

The planetary gears 51 and 52 are rotatably attached to positions offset from the central axis CA that is the rotation center of the arm 43. The planetary gear 51 engages with the sun gear 50 with its central axis located at a rotation center PC1 of the wheel 61. The planetary gear 52 engages with the sun gear 50 with its central axis located at a rotation center PC2 of the wheel 62. Thus, the wheels 61 and 62 rotate in directions of arrows A1 and A2 in FIG. 3 in association with the rotation of the first rotational shaft 41. The planetary gears 51 and 52 have the same number of teeth. The wheels 61 and 62 have the same diameter.

Rotational shafts of the planetary gears 51 and 52 are fixed onto the arm 43 serving as a carrier. Torques of the planetary gears 51 and 52 are transmitted by the sun gear 50. Thus, the unit 11 has a structure similar to that of a planetary-gearing speed reducer.

The driver 20 drives the first rotational shaft 41 and the second rotational shaft 42 to rotate. The driver 20 includes a motor 21, a first speed reducer 22, a first driving shaft 23, a pulley 24, a clutch 25, a second driving shaft 26, gears 27 and 28, a brake 29, a second speed reducer 30, a pulley 31, the belts 32 and 34, and the pulleys 33 and 35.

The motor 21 is connected to the first driving shaft 23 via the first speed reducer 22. The first driving shaft 23 is connected to the first rotational shaft 41 by a first power transmission mechanism TM1 including the pulley 24, the belt 32, and the pulley 33. Thus, the first rotational shaft 41 can be driven to rotate by the motor 21.

The first rotational shaft 41 engages with the second driving shaft 26 via the clutch 25. The second driving shaft 26 is connected to a second power transmission mechanism TM2 via the second speed reducer 30. The second power transmission mechanism TM2 includes the pulley 31, the belt 34, and the pulley 35, and connects the second driving shaft 26 and the second rotational shaft 42. Thus, the second rotational shaft 42 can be driven to rotate by the motor 21 via the clutch 25. The second rotational shaft 42 is connected to the brake 29 via the gears 27 and 28. The brake 29 restricts the rotation of the second rotational shaft 42.

The processor 10 can selectively operate the units 11 to 14 in a first mode or a second mode. In the first mode, the clutch 25 is disengaged. In the second mode, the clutch 25 is engaged and the brake 29 is released. In some embodiments, it is not desirable to simultaneously drive the clutch 25 and the brake 29. This is because a torque of the motor 21 is transmitted to the brake 29 and the motor 21 has an excessive load when the clutch 25 and the brake 29 are driven simultaneously. Details of the first and second modes are described later.

Operations in First Mode

In the first mode, the wheels 61 and 62 rotate about their axes. In the first mode, the clutch 25 is disengaged. The first driving shaft 23 can be driven to rotate by the motor 21 without rotating the second driving shaft 26. A driving force of the first driving shaft 23 is transmitted to the first rotational shaft 41 via the first power transmission mechanism TM1 (pulley 24, belt 32, and pulley 33), and the sun gear 50 is driven to rotate. Thus, the planetary gears 51 and 52 rotate and the wheels 61 and 62 rotate.

Figures 4, 5:
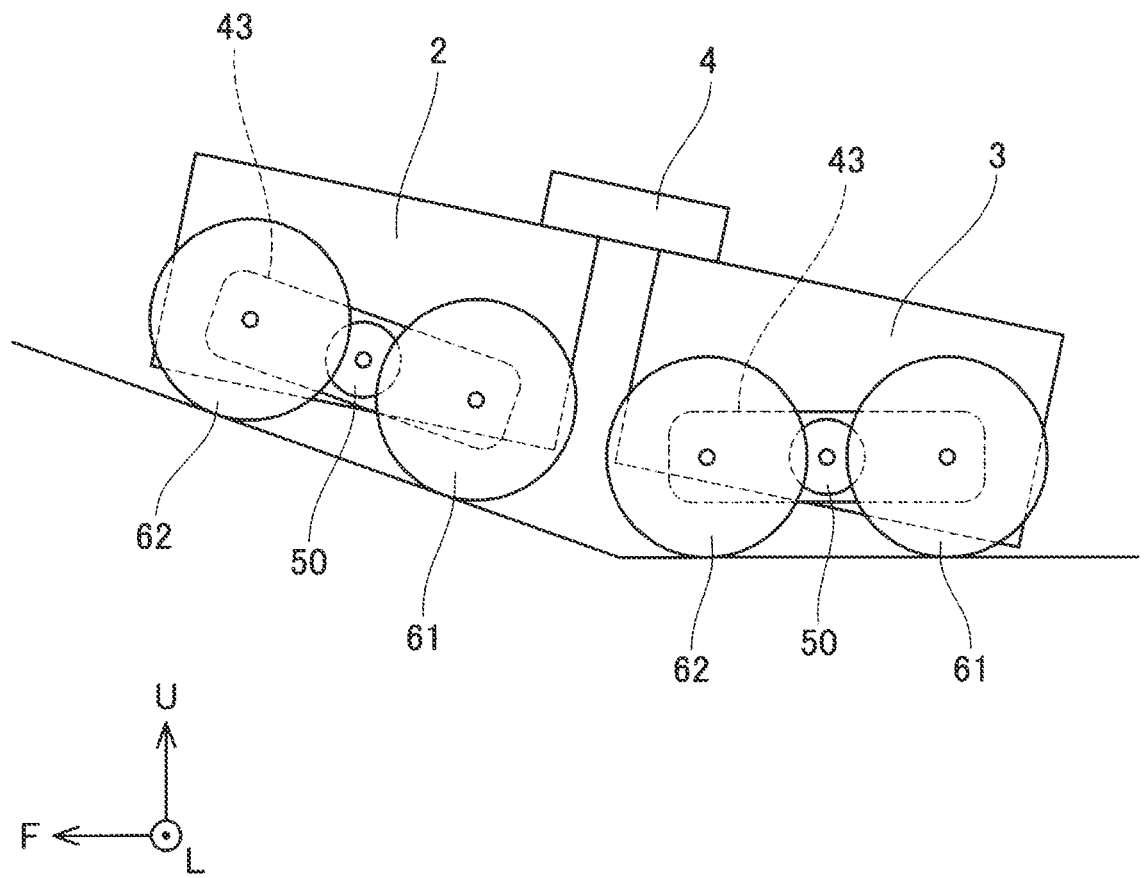
FIG. 4 is a side view illustrating a traveling state of the vehicle 1.
FIG. 5 is a table illustrating specific examples of setting values in a speed reducing system.

When the brake 29 is driven, the arm 43 can be held stationary. The wheels 61 and 62 can be rotated with the arm fixed. When the brake 29 is released, a driving torque of the arm 43 can be set to 0. The arm 43 is rotated by forces received by the wheels 61 and 62 from the ground. Thus, the arm 43 can be rotated in conformity with the shape of irregularities of a traveling surface as illustrated in FIG. 4. The arm 43 can function as a suspension that appropriately holds the wheels 61 and 62 on a road surface.

Operations in Second Mode

In the second mode, the wheels 61 and 62 rotate about the central axis CA of the arm 43. In the second mode, the clutch 25 is engaged and the brake 29 is released. Both the first driving shaft 23 and the second driving shaft 26 can be driven to rotate by the motor 21. As described above, the driving force of the first driving shaft 23 is transmitted to the wheels 61 and 62 via the first rotational shaft 41. A driving force of the second driving shaft 26 is transmitted to the second rotational shaft 42 via the second speed reducer 30 and the second power transmission mechanism TM2 (pulley 31, belt 34, and pulley 35), and the arm 43 is driven to rotate. That is, when the clutch 25 is engaged, the torque of the motor 21 is transmitted both to the wheels 61 and 62 and to the arm 43.

The rotation speeds of the wheels 61 and 62 in the second mode are determined by constants in a speed reducing system. In the vehicle 1 described herein, a gear ratio (or torque ratio) among the second rotational shaft 42, the sun gear 50, and the planetary gear 51 is set to "(n+1):1:−n". In other words, an angular velocity ratio among the second rotational shaft 42, the sun gear 50, and the planetary gear 51 is set to "n:n(n+1):−(n+1)". The angular velocity ratio between the sun gear 50 and the planetary gear 51 is determined depending on the gear ratio between the sun gear 50 and the planetary gear 51. The angular velocity ratio between the sun gear 50 and the second rotational shaft 42 is determined depending on a gear ratio obtained in consideration of three elements that are the first power transmission mechanism TM1, the second speed reducer 30, and the second power transmission mechanism TM2. This is because the sun gear 50 and the second rotational shaft 42 are connected via the first power transmission mechanism TM1 (pulley 33, belt 32, and pulley 24), the second speed reducer 30, and the second power transmission mechanism TM2 (pulley 31, belt 34, and pulley 35).

By using the gear ratio described above, an operation in which "the arm 43 rotates relative to a vehicle body without rotating the wheels 61 and 62 relative to the vehicle body" can be achieved in the second mode. Thus, a staircase ascending/descending operation can securely be executed as described later.

Conditions to be Satisfied by Speed Reducing System

Description is given of the principle that can achieve the operation in which "the arm 43 rotates relative to the vehicle body without rotating the wheels 61 and 62 relative to the vehicle body" by setting the gear ratio among the second rotational shaft 42, the sun gear 50, and the planetary gear 51 to "(n+1):1:−n" and rotating the second rotational shaft 42 and the planetary gear 51 in opposite directions.

Since the central axis of the planetary gear 51 is fixed to the arm 43, an angular velocity $\omega_p$ of the planetary gear 51 in a coordinate system fixed to the vehicle body is the sum of an angular velocity $\omega_a$ of the arm 43 in the coordinate system fixed to the vehicle body and an angular velocity $\omega^a_p$ of the planetary gear 51 in a coordinate system fixed onto the arm 43. Thus, Expression (1) is established.

$$\omega_p = \omega_a + \omega^a_p \quad \text{Expression (1)}$$

It is assumed that "$\omega_s$" represents an angular velocity of the sun gear 50 in the coordinate system fixed to the vehicle body. An angular velocity $\omega^a_s$ of the sun gear 50 in the coordinate system fixed onto the arm 43 is represented by Expression (2).

$$\omega^a_s = \omega_s - \omega_a \quad \text{Expression (2)}$$

When the gear ratio between the sun gear 50 and the planetary gear 51 is 1:−n, the angular velocity ratio between the sun gear 50 and the planetary gear 51 is n:−1. The negative sign of the value in the ratio indicates that the gears rotate in opposite directions. Thus, the angular velocity $\omega^a_p$ of the planetary gear 51 in the coordinate system fixed onto the arm 43 is represented by Expression (3).

$$\omega^a_p = -\omega^a_s/n = -(\omega_s - \omega_a)/n \quad \text{Expression (3)}$$

Based on the above, the angular velocity $\omega_p$ of the planetary gear 51 in the coordinate system fixed to the vehicle body is represented by Expression (4).

$$\omega_p = \omega_a - (\omega_s - \omega_a)/n \quad \text{Expression (4)}$$

When a condition that the planetary gear 51 does not rotate relative to the vehicle body, that is, $\omega_p = 0$ is substituted into Expression (4), Expression (5) is obtained.

$$\omega_s = (n+1)\omega_a \quad \text{Expression (5)}$$

As understood from Expression (5), the gear ratio between the second rotational shaft 42 and the sun gear 50 is (n+1):1.

Thus, the condition that the planetary gear 51 does not rotate relative to the vehicle body is "(n+1):1:−n" in terms of the gear ratio among the second rotational shaft 42, the sun gear 50, and the planetary gear 51. However, a condition "n≠−1, 0" exists. This is because the gear ratio cannot be 0.

Devised Points in Mechanism and Specific Examples of Setting Values in Speed Reducing System In some embodiments, a gear ratio from the motor 21 to the sun gear 50 is larger than 7 and smaller than 40. In some embodiments, a gear ratio from the motor 21 to the arm 43 is larger than 27 and smaller than 113. To achieve those gear ratios, several constraints exist. The first constraint is that a speed reducer having a large gear ratio increases in its size and mass. The second constraint is that the gear ratio can only be set to about 2 in power transmission using a pulley as in the first power transmission mechanism TM1 and the second power transmission mechanism TM2.

The unit 11 herein includes the following mechanism to address those constraints. The first speed reducer 22 is arranged immediately next to the motor 21, and power is transmitted to the sun gear 50 through speed reduction via the first power transmission mechanism TM1. The second speed reducer 30 is arranged at a position succeeding the clutch 25 that switches torque transmission to the arm 43. Thus, the gear ratio up to the arm 43 can be increased. The brake 29 for holding the arm 43 stationary is arranged at a position preceding the second speed reducer 30. Thus, a holding torque of the brake 29 can be reduced.

A table of FIG. 5 illustrates specific examples of setting values in the speed reducing system according to this embodiment. FIG. 5 illustrates examples of setting values in the speed reducing system in a case of n=2. That is, the gear ratio among the second rotational shaft 42, the sun gear 50, and the planetary gear 51 is "3:1:−2" in this example. In this case, the planetary gear 51 rotates opposite to the second rotational shaft 42 and the sun gear 50.

Staircase Ascending/Descending Operation

Figure 6:
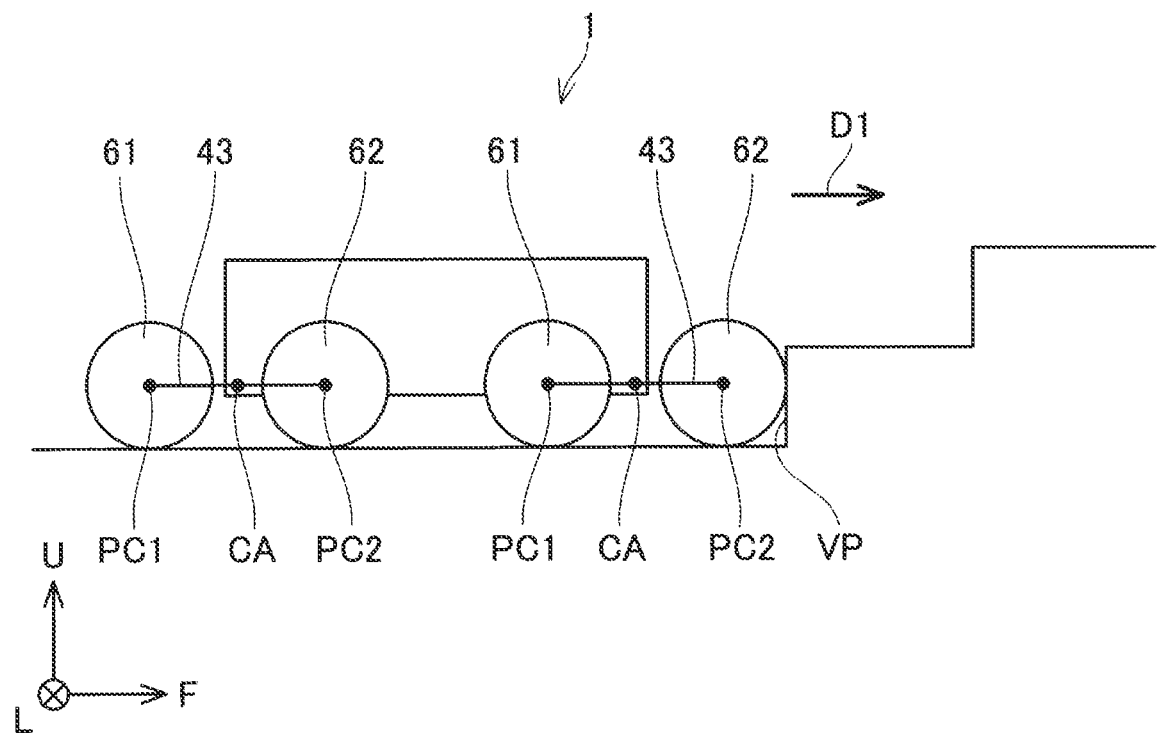
FIG. 6 is a diagram for describing a staircase ascending/descending operation of the vehicle 1.
Figure 7:
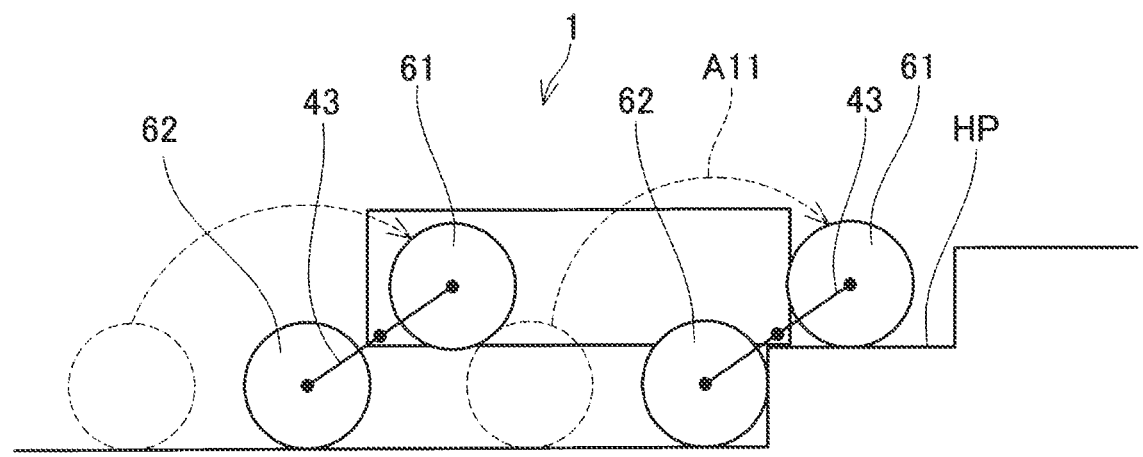
FIG. 7 is a diagram for describing the staircase ascending/descending operation of the vehicle 1.
Figure 8:
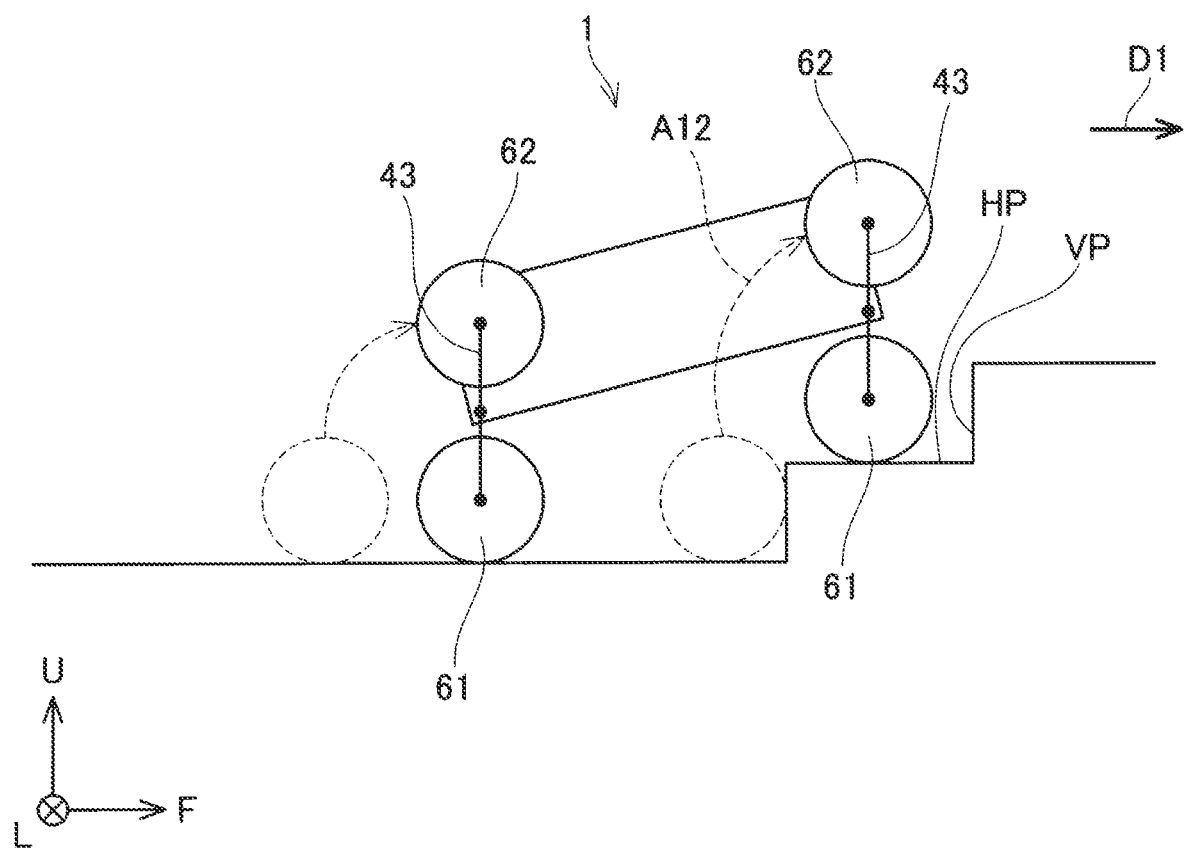
FIG. 8 is a diagram for describing the staircase ascending/descending operation of the vehicle 1.

The staircase ascending/descending operation of the vehicle 1 is described with reference to FIG. 6 to FIG. 8. To facilitate understanding, FIG. 6 to FIG. 8 illustrate a case where the vehicle 1 has one vehicle body. Each arm 43 is represented simply by a straight line. The first mode is used during traveling along flat ground. The vehicle 1 travels in a traveling direction D1 (rightward in the drawing sheets) by driving the wheels. As illustrated in FIG. 6, the wheel 62 abuts against a vertical face VP of a step, and the vehicle 1 stops.

The first mode is switched to the second mode. The arm 43 is rotated relative to the vehicle 1 without rotating the wheels 61 and 62 relative to the vehicle 1. Thus, as indicated by an arrow A11 in FIG. 7, the wheel 61 can be lifted about the wheel 62 serving as a pivot and brought into contact with the surface of a tread HP.

By continuously using the second mode, the wheel 62 can be lifted about the wheel 61 serving as a pivot as indicated by an arrow A12 in FIG. 8. Thus, the wheel 62 can be positioned above the tread HP.

In the state of FIG. 8, the second mode is switched to the first mode. That is, the arm 43 can be held stationary by driving the brake 29. Thus, the posture in FIG. 8 can be kept. The wheel 61 can be driven to rotate by disengaging the clutch 25 and driving the motor. Thus, the vehicle 1 can travel in the traveling direction D1. When the wheel 61 comes into contact with a next vertical face VP, the vehicle 1 stops and the first mode is switched to the second mode. Then, the operations described above are repeated to ascend the staircase.

Effects

In a case where the mode for rotating the wheels 61 and 62 and the mode for rotating the arm are independently controlled in related art, both a motor for driving the wheels 61 and 62 and a motor for driving the arm 43 are necessary. However, a problem arises in terms of an increase in costs and weight because two motors are necessary per unit. The vehicle 1 disclosed herein employs the mechanism in which both the wheels 61 and 62 and the arm 43 are driven by one motor 21. That is, the wheels 61 and 62 can be rotated by the first rotational shaft 41 and the sun gear 50 by disengaging the clutch 25. Further, the arm 43 can be rotated by the second rotational shaft 42 by engaging the clutch 25. The number of motors can be reduced as compared to the case where the wheel drive motor and the arm drive motor are provided individually. The costs and weight can be reduced.

In the staircase ascending/descending mechanism described in FIG. 7 and FIG. 8, it is necessary that the wheel serving as the pivot be held stationary to rotate the arm. In the related art, the wheel serving as the pivot is fixed by an external factor that is friction between the wheel and the tread. Under a condition that the mass of the vehicle body or a load is large in a low-friction environment, wheel idling is likely to occur rather than arm rotation. That is, the related art has a problem that the wheel slips and the vehicle cannot ascend or descend the staircase well in a case of a low coefficient of friction between the tread and the wheel. In the vehicle 1 disclosed herein, the planetary gearing mechanism is used and the gear ratio among the second rotational shaft 42, the sun gear 50, and the planetary gear 51 is set to "(n+1):1:−n". This structure can achieve the operation in which "the arm 43 rotates relative to the vehicle body without rotating the wheels 61 and 62 relative to the vehicle body". Thus, the wheel 61 or 62 serving as the pivot can be held stationary while a driving force is applied from the motor. That is, a braking mechanism that prevents wheel idling can be achieved by the driving force of the motor. Thus, the staircase ascending/descending operation can securely be executed even under the low-friction environment.

Second Embodiment

Figure 9:
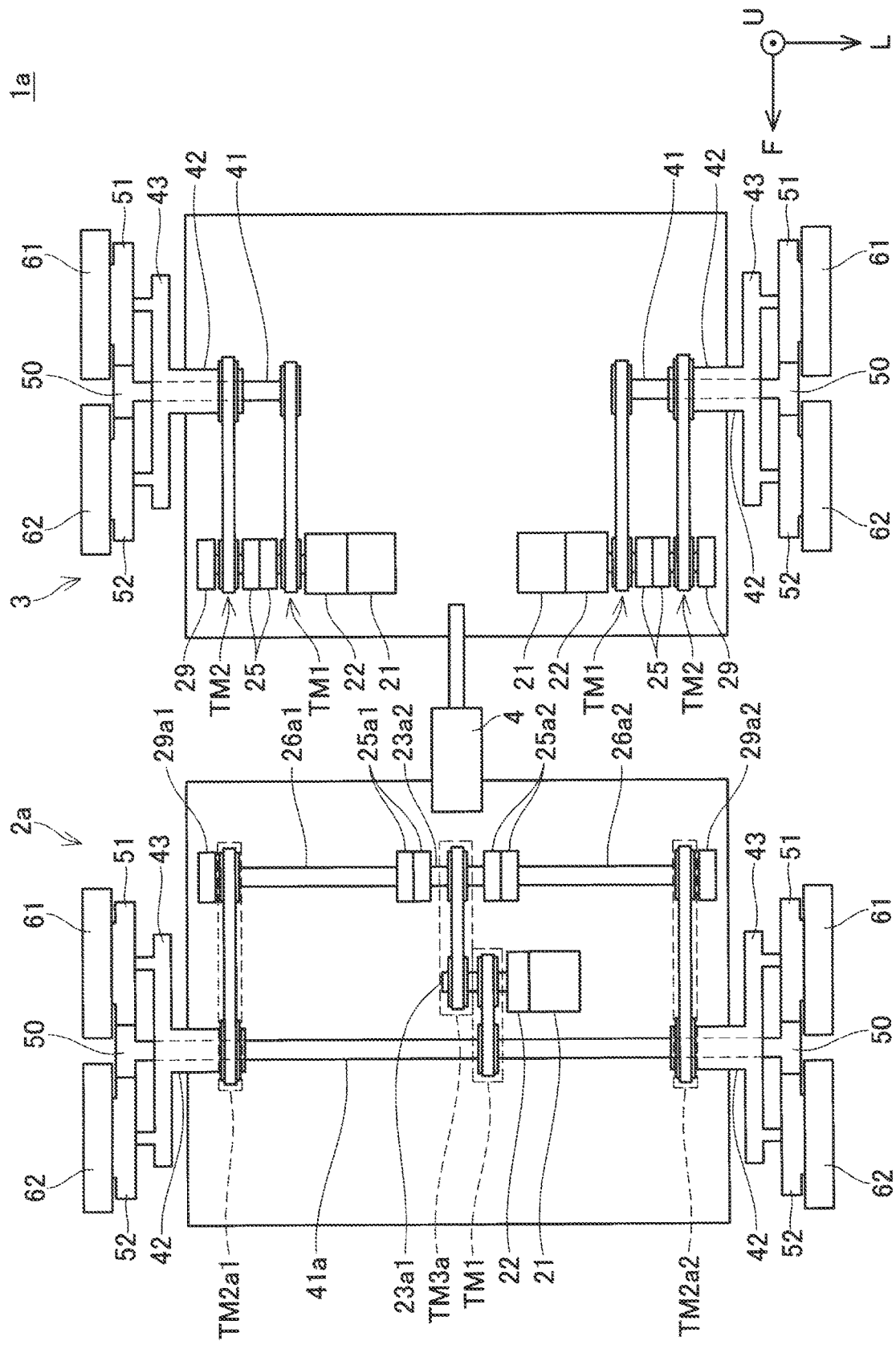
FIG. 9 is a schematic top view of a vehicle 1a according to a second embodiment.

FIG. 9 is a schematic top view of a vehicle 1a according to a second embodiment. Components similar to those in the vehicle 1 of the first embodiment are represented by the same reference symbols to omit their description. Components unique to the second embodiment are suffixed with "a" for distinction. In the vehicle 1a, the structure of the rear vehicle 3 is similar to that in the first embodiment. That is, the rear vehicle 3 includes two motors 21 and two right and left first rotational shafts 41. The structure of a front vehicle 2a of the vehicle 1a differs from the structure of the front vehicle 2 in the first embodiment. That is, the front vehicle 2a includes one motor 21 and one first rotational shaft 41a common to right and left sides. The front vehicle 2a is mainly described below.

The motor 21 is connected to a first driving shaft 23a1 via the first speed reducer 22. The first driving shaft 23a1 is connected to the first rotational shaft 41a by the first power transmission mechanism TM1. The first rotational shaft 41a is a single shaft for simultaneously rotating the right and left wheels of the front vehicle 2a. The sun gears 50 are arranged at both ends of the first rotational shaft 41a in a vehicle width direction.

The first driving shaft 23a1 is connected to a first driving shaft 23a2 by a third power transmission mechanism TM3a including pulleys and a belt. The first driving shaft 23a2 engages with a second driving shaft 26a1 on the right side of the vehicle via a clutch 25a1, and with a second driving shaft 26a2 on the left side of the vehicle via a clutch 25a2. The second driving shaft 26a1 is connected to a brake 29a1 and to the second rotational shaft 42 on the right side of the vehicle via a second power transmission mechanism TM2a1. The second driving shaft 26a2 is connected to a brake 29a2 and to the second rotational shaft 42 on the left side of the vehicle via a second power transmission mechanism TM2a2.

Operations of Front Vehicle 2a

In the first mode, the clutches 25a1 and 25a2 are disengaged. The driving force of the motor 21 is transmitted to the first rotational shaft 41a via the first driving shaft 23a1 and the first power transmission mechanism TM1. Thus, the right and left wheels 61 and 62 of the front vehicle 2a rotate at the same rotation speed. The vehicle 1a can be steered by controlling the right and left wheels of the rear vehicle 3 independently of each other.

In the second mode, the clutches 25a1 and 25a2 are engaged and the brakes 29a1 and 29a2 are released. The driving force of the motor 21 is transmitted to the right and left second rotational shafts 42 via the first driving shaft 23a1, the third power transmission mechanism TM3a, the first driving shaft 23a2, the clutches 25a1 and 25a2, the second driving shafts 26a1 and 26a2, and the second power transmission mechanisms TM2a1 and TM2a2. Thus, the right and left arms 43 of the front vehicle 2a rotate at the same rotation speed.

In the vehicle 1a according to the second embodiment, the number of motors can further be reduced from four to three as compared to the vehicle 1 of the first embodiment (FIG. 1). It is possible to increase the effect of reducing the costs and weight.

Third Embodiment

Figure 10:
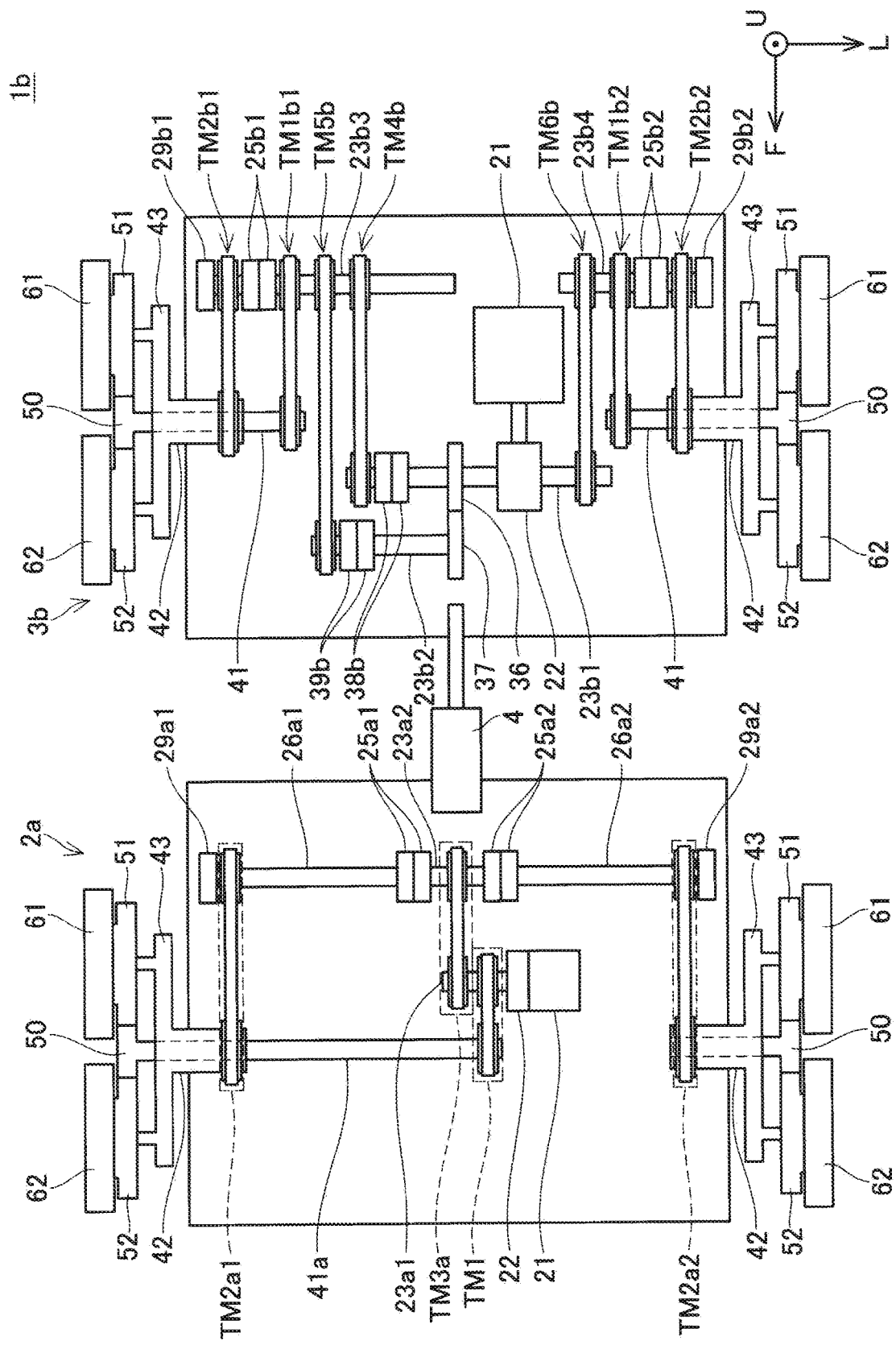
FIG. 10 is a schematic top view of a vehicle 1b according to a third embodiment.

FIG. 10 is a schematic top view of a vehicle 1b according to a third embodiment. Components unique to the third embodiment are suffixed with "b" for distinction. The structure of the front vehicle 2a of the vehicle 1b is similar to that in the second embodiment, and therefore description of the structure is omitted. The structure of a rear vehicle 3b of the vehicle 1b differs from the structure of the rear vehicle 3 in each of the first and second embodiments. That is, the rear vehicle 3b includes one motor 21. The rear vehicle 3b is mainly described below.

The motor 21 is connected to a first driving shaft 23b1 via the first speed reducer 22. The first driving shaft 23b1 is connected to a first driving shaft 23b3 by a clutch 38b and a fourth power transmission mechanism TM4b. The first driving shaft 23b1 is connected to the first driving shaft 23b3 also by gears 36 and 37, a first driving shaft 23b2, a clutch 39b, and a fifth power transmission mechanism TM5b. The first driving shaft 23b3 is connected to the first rotational shaft 41 on the right side of the vehicle by a first power transmission mechanism TM1b1. The first driving shaft 23b3 is connected to the second rotational shaft 42 on the right side of the vehicle via a clutch 25b1 and a second power transmission mechanism TM2b1.

The first driving shaft 23b1 is connected to a first driving shaft 23b4 by a sixth power transmission mechanism TM6b. The first driving shaft 23b4 is connected to the first rotational shaft 41 on the left side of the vehicle by a first power transmission mechanism TM1b2. The first driving shaft 23b4 is connected to the second rotational shaft 42 on the left side of the vehicle via a clutch 25b2 and a second power transmission mechanism TM2b2.

Operations of Rear Vehicle 3b

In the first mode, the clutches 25b1 and 25b2 are disengaged. To rotate the right and left wheels of the vehicle in the same direction (travel straightforward), the clutch 38b is engaged and the clutch 39b is disengaged. The driving force of the motor 21 is transmitted to the first rotational shaft 41 on the right side of the vehicle via the first driving shaft 23b1, the clutch 38b, the fourth power transmission mechanism TM4b, the first driving shaft 23b3, and the first power transmission mechanism TM1b1. The driving force of the motor 21 is transmitted to the first rotational shaft 41 on the left side of the vehicle via the sixth power transmission mechanism TM6b, the first driving shaft 23b4, and the first power transmission mechanism TM1b2.

To rotate the right and left wheels of the vehicle in opposite directions (make a spin turn), the clutch 38b is disengaged and the clutch 39b is engaged. A driving force of rotation opposite to that of the first driving shaft 23b1 is transmitted to the first driving shaft 23b2 by the gears 36 and 37. The driving force of the first driving shaft 23b2 is transmitted to the first rotational shaft 41 on the right side of the vehicle via the clutch 39b, the fifth power transmission mechanism TM5b, the first driving shaft 23b3, and the first power transmission mechanism TM1b1.

In the second mode, the clutches 25b1 and 25b2 are engaged and brakes 29b1 and 29b2 are released. The driving force of the first driving shaft 23b3 is transmitted to the second rotational shaft 42 on the right side of the vehicle via the clutch 25b1 and the second power transmission mechanism TM2b1. The driving force of the first driving shaft 23b4 is transmitted to the second rotational shaft 42 on the left side of the vehicle via the clutch 25b2 and the second power transmission mechanism TM2b2.

In the vehicle 1b according to the third embodiment, the number of motors can further be reduced from four to two as compared to the vehicle 1 of the first embodiment (FIG. 1). It is possible to increase the effect of reducing the costs and weight.

Although the specific examples of the present disclosure are described above in detail, the examples are only illustrative and are not intended to limit the claims. The technologies described in the claims encompass various modifications and changes to the specific examples described above. The technical elements described herein or illustrated in the drawings exert technical utility solely or in various combinations, and are not limited to the combination described in the claims as filed. The technologies described herein or illustrated in the drawings may simultaneously achieve a plurality of objects, and exert technical utility by achieving one of the objects.

MODIFIED EXAMPLES

The number of planetary gears mounted on the arm is not limited to two, and may be three or more. For example, three planetary gears may radially be mounted about the central axis CA of the arm 43. The sun gear may engage with the three planetary gears.

The power transmission mechanism is not limited to the structure including the pulleys and the belt. For example, the power transmission mechanism may include a chain or gears.

What is claimed is:

1. A motor-driven vehicle comprising:
a motor;
a first driving shaft to be driven to rotate by the motor;
a first rotational shaft to be driven to rotate by the motor;
a first power transmission mechanism connecting the first driving shaft and the first rotational shaft;
a clutch;
a second driving shaft to be driven to rotate by the motor via the clutch;
a second rotational shaft to be driven to rotate by the motor via the clutch;
a second power transmission mechanism connecting the second driving shaft and the second rotational shaft;
an arm configured to rotate in association with rotation of the second rotational shaft; and
at least two wheels, each of the at least two wheels being attached to the arm at a position offset from a rotation center of the arm, and each of the at least two wheels being rotatable in association with rotation of the first rotational shaft.

2. The motor-driven vehicle according to claim 1, further comprising a brake configured to restrict the rotation of the second rotational shaft.

3. The motor-driven vehicle according to claim 2, further comprising a processor configured to selectively execute a first mode in which the clutch is disengaged and the brake is operated, or a second mode in which the clutch is engaged and the brake is released.

4. The motor-driven vehicle according to claim 1, further comprising:
a sun gear located at the rotation center of the arm and rotatable in association with the rotation of the first rotational shaft; and
planetary gears located at rotation centers of the at least two wheels and engaging with the sun gear,
wherein a central axis of the first rotational shaft and a central axis of the second rotational shaft are coaxial.

5. The motor-driven vehicle according to claim 4, wherein a gear ratio among the second rotational shaft, the sun gear, and the planetary gears is $(n+1):1:-n$.

6. The motor-driven vehicle according to claim 1, wherein the second rotational shaft is a hollow shaft, and the first rotational shaft penetrates the second rotational shaft.

* * * * *